United States Patent
Wolf

(10) Patent No.: US 10,981,308 B2
(45) Date of Patent: Apr. 20, 2021

(54) METHOD AND DEVICE FOR PRODUCING A TUBE FROM THERMOPLASTIC SYNTHETIC MATERIAL VIA INJECTION MOULDING

(71) Applicant: KAUTEX TEXTRON GMBH & CO. KG, Bonn (DE)

(72) Inventor: Hartmut Wolf, Koenigswinter (DE)

(73) Assignee: KAUTEX TEXTRON GMBH & CO. KG, Bonn (DE)

(*) Notice: Subject to any disclaimer, the term of this patent is extended or adjusted under 35 U.S.C. 154(b) by 244 days.

(21) Appl. No.: 16/070,060

(22) PCT Filed: Jan. 10, 2017

(86) PCT No.: PCT/EP2017/050434
§ 371 (c)(1),
(2) Date: Jul. 13, 2018

(87) PCT Pub. No.: WO2017/121738
PCT Pub. Date: Jul. 20, 2017

(65) Prior Publication Data
US 2018/0354172 A1 Dec. 13, 2018

(30) Foreign Application Priority Data
Jan. 15, 2016 (DE) .................. 10 2016 200 484.0

(51) Int. Cl.
*B29C 45/14* (2006.01)
*B29C 45/26* (2006.01)
(Continued)

(52) U.S. Cl.
CPC ........ *B29C 45/14065* (2013.01); *B29B 11/08* (2013.01); *B29C 45/14819* (2013.01);
(Continued)

(58) Field of Classification Search
None
See application file for complete search history.

(56) References Cited

U.S. PATENT DOCUMENTS 7,850,100 B2   12/2010   Cagnolati et al.
9,849,775 B2   12/2017   Eberhardt et al.
(Continued)

FOREIGN PATENT DOCUMENTS

CN   101201036   6/2008
DE   102009001276   7/2010
(Continued)

OTHER PUBLICATIONS

Machine English translation of DE102015102640, Accessed Jun. 23, 2020 (Year: 2014).*
(Continued)

*Primary Examiner* — Peter L Vajda
*Assistant Examiner* — Adrianna N Konves
(74) *Attorney, Agent, or Firm* — Grossman, Tucker, Perreault & Pfleger, PLLC

(57) ABSTRACT

The invention relates to a method for producing a tubular component as an article from a thermoplastic synthetic material while using an injection-molding device having a tool that forms an article cavity, having means for filling the article cavity with a thermoplastic molding compound, and having an injection device for injecting a fluid into the article cavity, wherein the injection device comprises a nozzle body, wherein the method provides that the nozzle body is used as a mold core for molding the shape of an end of the article, that the nozzle body is used as a carrier for an additional component to be incorporated into the article, wherein: a) the nozzle body first equipped with the additional component, b) the nozzle body is introduced into the closed article cavity, or the tool is closed around the nozzle (Continued)

body, c) the article cavity in a further method step is at least partially filled with the thermoplastic molding compound, d) a pressurized fluid is then induced into the article cavity by means of the injection device, wherein part of the molding compound is displaced into a secondary cavity, and e) the article is de-molded. The invention furthermore relates to an injection-molding device for carrying out the method.

20 Claims, 2 Drawing Sheets

(51) Int. Cl.
| | | |
|---|---|---|
| | *B29C 45/17* | (2006.01) |
| | *B29B 11/08* | (2006.01) |
| | *B29C 45/20* | (2006.01) |
| | B29C 45/00 | (2006.01) |
| | B29C 49/06 | (2006.01) |
| | B29K 101/12 | (2006.01) |
| | B29L 31/00 | (2006.01) |

(52) U.S. Cl.
CPC ...... *B29C 45/1704* (2013.01); *B29C 45/1734* (2013.01); *B29C 45/20* (2013.01); *B29C 45/261* (2013.01); *B29B 2911/14013* (2013.01); *B29B 2911/1444* (2013.01); *B29B 2911/14506* (2013.01); *B29C 45/1459* (2013.01); *B29C 49/06* (2013.01); *B29C 2045/0087* (2013.01); *B29K 2101/12* (2013.01); *B29K 2905/00* (2013.01); *B29K 2995/0008* (2013.01); *B29L 2031/712* (2013.01)

(56) References Cited

U.S. PATENT DOCUMENTS

| | | |
|---|---|---|
| 2002/0001634 A1 | 1/2002 | Komazawa et al. |
| 2009/0008416 A1 | 1/2009 | Kurosawa et al. |

FOREIGN PATENT DOCUMENTS

| | | |
|---|---|---|
| DE | 102011009745 | 8/2012 |
| DE | 102011100132 | 10/2012 |
| DE | 102015102640 | 8/2015 |
| EP | 1975349 | 1/2008 |
| JP | S56121745 | 9/1981 |
| JP | H06155502 | 6/1994 |
| JP | 2002137253 | 5/2002 |
| JP | 2012213919 | 11/2012 |
| WO | 2009/138431 | 11/2009 |

OTHER PUBLICATIONS

Machine English translation of WO2009138431, Accessed Jun. 23, 2020 (Year: 2008).*
Office Action from related Chinese Appln. No. 201780006402.4, dated Mar. 2, 2020. English translation attached.
English translation of International Preliminary Report on Patentability from corresponding PCT Appln. No. PCT/EP2017/050434, dated Mar. 28, 2018.
English translation of International Search Report dated May 11, 2017, received in corresponding PCT Application No. PCT/EP2017/050434.

* cited by examiner

METHOD AND DEVICE FOR PRODUCING A TUBE FROM THERMOPLASTIC SYNTHETIC MATERIAL VIA INJECTION MOULDING

FIELD

The invention relates to a method for producing a tubular component as an article from a thermoplastic synthetic material while using an injection-molding device. The invention furthermore relates to an injection-molding device for producing such a tubular component.

The invention relates in particular to a method for producing an article as a tube or a tube connector of a liquids container.

BACKGROUND

Filler tubes for fuel containers or for additive containers for motor vehicles in particular are nowadays blow-molded or vulcanized in pieces and then assembled from the individual pieces. The filler tube head as an injection-molded welded group is fitted to the upper end of a tube that is, for example, extrusion-blow-molded. Ventilation lines that are attached laterally are fastened to nipples that are welded to said tube. The production of a filler tube in the manner described above is comparatively complex. Costs arise in each fitting and in each welding. The filler tube after assembly has to be checked for tightness, this causing further costs.

A filler connector for a urea container of a motor vehicle is known, for example, from DE 10 2011 009 745 A1, wherein the filler connector has a connector housing which defines an orifice connector for a supply valve and a filling duct into the container, wherein a receptacle structure for a supply valve is provided within the connector housing. The connector housing furthermore encloses an annular magnet which is encapsulated in a fluid-tight manner in an annular synthetic material housing within the connector housing. In order for the annular magnet and other elements for channeling a volumetric filling flow to be able to be disposed within the connector housing it is necessary for the connector housing to be designed in multiple parts. A plurality of injection-molding tools are required to this end, this likewise being comparatively complex.

An injection-molding device for producing a tubular component as an article from a thermoplastic synthetic material, having a tool that forms an article cavity, having means for filling the article cavity with a thermoplastic molding compound, and having at least one injection device for injecting a fluid into the article cavity is known from WO 2009/138431 A1, wherein the injection device comprises a nozzle body and has at least one fluid duct which is capable of being supplied with a pressurized fluid.

A method for producing a synthetic material hose that is reinforced with a woven fabric hose is known from DE 10 2015 102640 A1. Further prior art is derived from documents JP H06 155502 A, DE 10 2009 001276 B3, JP 2002 17253 A, EP 1 975 349 A1, and JP S56 121745 A.

SUMMARY

The invention is based on the object of providing a method for producing a tubular component as an article from a thermoplastic synthetic material while using an injection-molding device, said method being simplified as compared with the methods known to date. In particular, the production of a complex tubular component, for example as a tubular connector or a connector housing having a filling duct, is to be possible in as few operating steps as possible. The invention is furthermore based on the object of providing a corresponding injection-molding device.

According to one aspect of the invention, a method for producing a tubular component as an article from a thermoplastic synthetic material is provided, while using an injection-molding device having a tool that forms an article cavity, having means for filling the article cavity with a thermoplastic molding compound, and having an injection device for injecting a fluid into the article cavity, wherein the injection device comprises a nozzle body, wherein the method provides that the nozzle body is used as a mold core for molding the shape of an end of the article, and that the nozzle body is used as a carrier for an additional component that is to be incorporated into the article, wherein a) the nozzle body is first equipped with the additional component;
b) the nozzle body is introduced into the closed cavity, or the tool is closed around the nozzle body;
c) the article cavity in a further method step is at least partially filled with the thermoplastic molding compound;
d) a pressurized fluid is then induced into the article cavity by means of the injection device, wherein part of the molding compound is displaced into a secondary cavity or into another volume; and
e) the article is de-molded.

The method steps a) to e) are preferably carried out in the sequence of the enumeration thereof, wherein it is not excluded that the method comprises in each case also intermediate steps.

A thermoplastic molding compound in the context of the present invention is a plasticized thermoplastic synthetic material which, for example, is fed to the injection-molding device, or to the tool, respectively, by means of an extruder by way of a sprue.

The secondary cavity can be kept shut, for example by means of one or a plurality of slides, until the article cavity has been partially or completely filled, the slide then preferably being opened after method step c), such that the pressurized fluid displaces a molten core of the molding compound into the secondary cavity, wherein the non-displaced part of the molding compound forms an article wall that has been left standing.

Alternatively, the molding compound can be displaced into another volume. To this end it can be provided, for example, for the molding compound to be conveyed back into an extruder which was used for providing the molding compound.

Any arbitrary thermoplastic polymer can be provided as the thermoplastic molding compound in the context of the invention. For example, a thermoplastic synthetic material which is chosen from a group comprising high-density polyethylene, polyamide, polyamide 6, polyamide 12, polyurethane, polycarbonate, acrylonitrile butadiene styrene copolymer, polyketone, polystyrene, olefin-based thermoplastic elastomers, olefin-based cross-linked thermoplastic elastomers, urethane-based thermoplastic elastomers, thermoplastic polyester elastomers, and thermoplastic copolymers can be provided as the thermoplastic molding compound.

It is provided according to the method according to the invention that the nozzle body closes and seals the article cavity at an end of the article cavity that forms a negative of the tubular component, wherein the nozzle body plunges into the article cavity and therein, conjointly with the article cavity, configures a cavity, preferably an annular space, that is capable of being filled with the thermoplastic molding compound. Before the nozzle body is moved into the article cavity, said nozzle body is expediently equipped with the additional component that is to be incorporated into the article. It can be provided, for example, that the tool, that is in two parts, for example is first opened, the nozzle body is equipped with the additional component at an opened tool, and the tool is then closed around the nozzle body.

Alternatively or additionally, the nozzle body can be disposed so as to be adjustable relative to the tool, specifically between a shape-imparting first position and a de-molded second position.

The nozzle body, or the mold core, respectively, is preferably pulled out of the tool, that is to say moved to a second de-molded position, prior to the article being de-molded, that is to say prior to method step e).

The nozzle body is expediently configured as a projectile carrier for receiving a projectile, wherein the nozzle body prior to method step d) is equipped with at least one projectile, and wherein the fluid that is induced by means of the injection device drives the projectile through the article cavity while displacing a molten core of the molding compound. Water, or else a gas, for example, can be used as a fluid.

The additional component in the method according to the invention is expediently embedded into the thermoplastic molding compound. The additional component can be connected to the thermoplastic molding compound in a materially integral manner and/or a form-fitting manner, for example.

In the case of one preferred variant of the method according to the invention it is provided that the nozzle body after method step d) and prior to method step e) is pulled out of the article cavity such that the additional component remains in the article. The additional component can be configured, for example, as a permanently magnetic ring which is releasably plug-fitted onto the nozzle body during method step a).

According to one preferred variant of the method according to the invention it is provided that the article is molded in the shape of a tube or a tube connector of a liquids container which defines a filling duct. The tube connector can be configured, for example, as a connector housing of a filler tube, for example for a secondary liquids container of a motor vehicle or for a fuel container of a motor vehicle, said connector housing being integrally configured according to the invention. It can be provided according to the method that the connector housing and a tubular portion adjoining the former are configured in the completely integral manner.

It is preferably provided according to the invention that the tube, the tube connector, or the tube housing, is produced by way of a lost additional component, for example in the form of an annular magnet. Such an annular magnet causes the activation of a switch valve that is provided in a supply valve, for example.

In the case of one expedient variant of the method of the invention it is provided for an internal delimitation wall of the article, for example a wall that delimits the filling duct, in the longitudinal direction to be profiled. When the internal delimitation wall of the article forms a filling duct, the latter can be provided with longitudinal ribs for example, which can serve for centering a supply valve that is to be inserted into the filling duct and for permitting a counter flow ventilation when filling.

In a preferred variant of the invention it is provided that the internal delimitation wall of the article is configured with at least one constriction which, for example, in the case where the inner delimitation wall of the article defines a filling duct of a tube or tube connector, can function as a plug-in delimitation stop for a supply valve.

The object on which the invention is based is furthermore achieved by an injection-molding device for producing a tubular component as an article from a thermoplastic synthetic material, in particular for carrying out the method described above, having a tool that forms an article cavity, having means for filling the article cavity with a thermoplastic molding compound, having at least one injection device for injecting a fluid into the article cavity, wherein the injection device comprises a nozzle body which has at least one fluid duct which is capable of being supplied with a pressurized fluid, wherein the nozzle body is configured as a mold core for molding the shape of an end of the article.

The tool can have two mold halves, for example, which when closed delimit an article cavity. The article cavity can define a negative of a tube or of a tube connector, for example.

At least one extrusion device, for example a conveyor-screw extruder, can be provided as a means for filling the article cavity.

The nozzle body, or the mold core, respectively, can be disposed so as to be adjustable relative to the tool, for example from a first, shape-imparting position in which the nozzle body plunges into the article cavity, to a second, de-molded position in which the nozzle body has been pulled out of the article cavity. The nozzle body is preferably disposed at one end of the article cavity and seals the latter in the first position.

The nozzle body in the article cavity configures a molding cavity that is capable of being filled with the molding compound. This molding cavity can be configured as an annular space; however, in principle, tubular components having a polygonal or prismatic cross section, respectively, are also producible using the injection-molding device according to the invention and by the method according to the invention. The term "tubular" is not fundamentally limited to a cylindrical cross section.

The tool according to the invention can have one or a plurality of sprues. The tool according to the invention can moreover have further movable mold parts such as slides, movable mold cores, and the like. The article cavity of the tool is expediently connected to a secondary cavity which receives the displaced molding compound. For example, the secondary cavity can be separable from the article cavity by means of one or a plurality of, for example hydraulically activatable, slides. It can alternatively be provided for a sprue to be provided at an end of the article cavity that is distant from the injection device and for the volume of an extruder to be utilized as the secondary cavity.

The injection device according to the invention is configured for injecting a highly pressurized fluid, for example for injecting water, into the article cavity, wherein the nozzle body can be penetrated by one or a plurality of fluid ducts.

In the injection-molding device according to the invention it is provided that the nozzle body is configured as a projectile carrier for receiving a projectile as the displacement member for the molding compound. In this case, the injection-molding device according to the invention is configured such that the pressurized fluid is injected toward the projectile, wherein the fluid drives the projectile through the article cavity, and the projectile displaces a molten core of the molding compound into the secondary cavity or into another volume. The projectile expediently has a cross section which is smaller than the cross section of the article cavity such that an article wall is left standing.

The nozzle body has a shape-imparting shank which conjointly with the article cavity forms a cavity that is capable of being filled with the molding compound. As has already been mentioned at the outset, this cavity can be provided as an annular space or else as a polygonal contour.

The shank is profiled such that the internal delimitation wall of the article on account thereof is likewise profiled in the longitudinal direction such that, for example when the article is configured as a tube or a tube connector, the wall of said article is molded having ribs that project into the cross-section of the filling duct.

The shank according to the invention has a first comparatively large and the second comparatively small cross section, and tapers off in the direction toward a distal end. The proximal end of the shank expediently seals the article cavity. The distal end of the shank is that end of the shank which is disposed downstream of the injected fluid.

The distal end of the shank is according to the invention configured as a projectile receptacle. The projectile can have a cross section that is larger than the second cross section, for example, such that the internal delimitation wall of the article by virtue of this design embodiment is producible having a constriction. The projectile herein within the article cavity in a particularly preferred manner forms an undercut that is capable of being filled with the molding compound.

The method according to the invention can provide that branches of the article to be molded in the shape of the tube are produced by means of further projectiles.

It can moreover be provided that the nozzle body can be configured as a projectile carrier for a plurality of projectiles, wherein a first projectile shapes a primary tube and a second projectile shapes a secondary tube, for example.

BRIEF DESCRIPTION OF THE DRAWINGS

The invention will be explained hereunder by means of an exemplary embodiment that is illustrated in the drawings in which.

DETAILED DESCRIPTION

Figure 2:
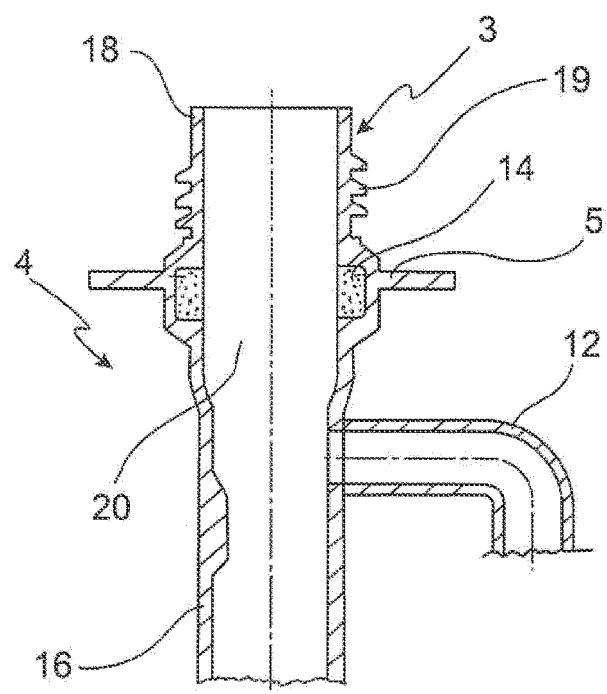
FIG. 2 shows a partial section through a filler tube for a urea container of a motor vehicle, said filler tube having been produced by the method according to the invention while using the tool according to the invention.

The injection-molding device 1 according to the invention comprises a tool 2 (only illustrated in outlines) which is composed of two mold halves, for example, which define an article cavity 3. The article cavity 3 can be configured as the negative of the filler tube 4 that is illustrated in FIG. 2, for example. The tool 2 can comprise a plurality of movable components in the form of slides or the like, and at least one secondary cavity. The secondary cavity is capable of being blocked in relation to the article cavity 3 by means of slides. These details are not illustrated in the figure for reasons of simplification. An extruder and one or a plurality of sprue ducts which open into the article cavity 3 are likewise not illustrated.

Figure 1:
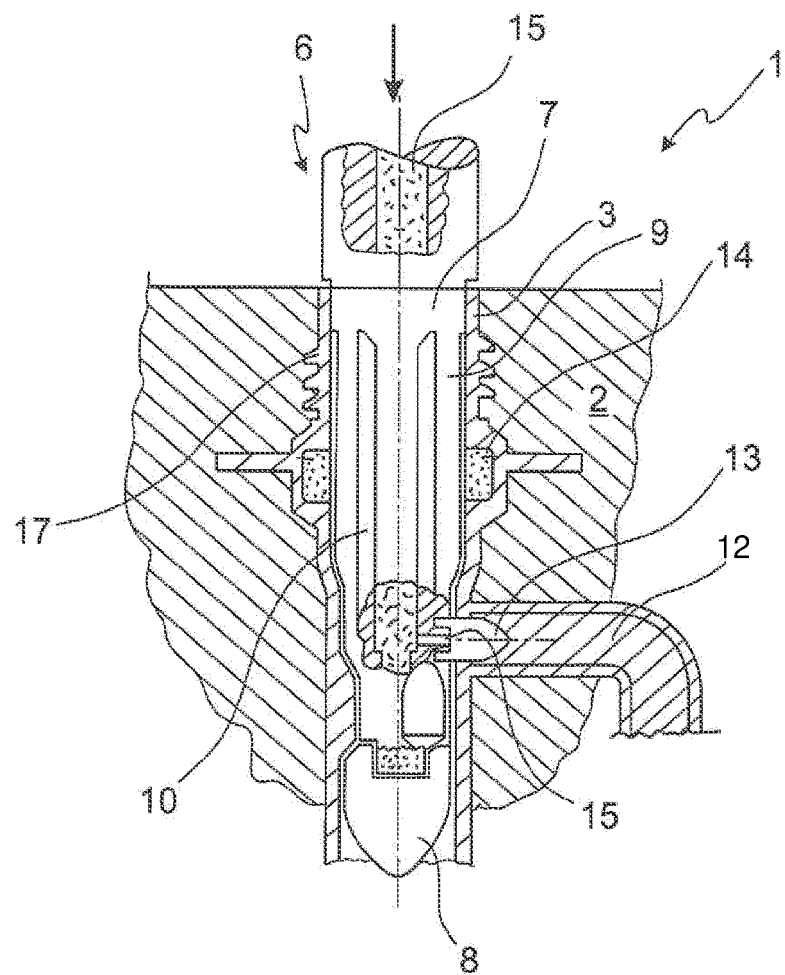
FIG. 1 shows a schematic partial section through an injection-molding device according to the invention.

FIG. 1 shows an end of the article cavity 3 in a region which is configured for molding the shape of the filler head 5 of the filler tube 4 illustrated in FIG. 2.

The injection-molding device 1 furthermore comprises an injection device 6 which comprises a nozzle body 7. The injection device 6 is likewise not completely illustrated in FIG. 1.

The nozzle body 7 is movable relative to the tool 2 from a first, shape-imparting position to a second, de-molded position, wherein FIG. 1 shows the first, shape-imparting position. The nozzle body 7 in this shape-imparting position plunges into the article cavity 3 and seals the article cavity 3 at the end side. The article cavity 3 at the end that is distant from the injection device 6 communicates with the secondary cavity (not illustrated).

The nozzle body 7 according to the invention is configured as a mold core and as a projectile carrier for receiving a projectile 8 from a thermoplastic synthetic material. The nozzle body 7 comprises a shank 9 which has a proximal end and a distal end, wherein the proximal end seals the article cavity 3 and the distal end receives the projectile 8.

The shank 9 at the proximal end thereof has a first, comparatively large diameter; the shank 9 at the distal end thereof has a second, comparatively small diameter. The shank 9 in the region of the first diameter is provided with grooves 10 that extend in the longitudinal direction, said grooves 10 defining corresponding ribs in an internal delimitation wall of the article to be produced.

The shank 9 conjointly with the article cavity 3 forms an annular space which by way of a sprue (not illustrated in the drawing) is capable of being filled with a thermoplastic molding compound.

The sprue is not illustrated in the drawing, said sprue in relation to the advancing direction of the projectile 8 being located downstream.

The article cavity 3 in the case of the exemplary embodiment illustrated in FIG. 1 comprises a branch in which the shape of a secondary tube 12 of the filler tube 4 can be molded. A second projectile 13 is disposed laterally on the nozzle body 7 in order for shape of the secondary tube 12 to be molded.

The nozzle body 7 is penetrated by a fluid duct 15 through which a highly-pressurized fluid can be induced into the article cavity 3. The fluid duct 15 branches off toward the distal end of the shank 9, on the one hand, said fluid duct 15 opening in the direction toward the projectile 8, and on the other hand branches off toward the side in the direction toward the second projectile 13. The fluid, for example water, in a pressurized manner is driven by way of the fluid duct 15 toward the projectile 8 and toward the second projectile 13, wherein the projectile 8 and the second projectile 13, driven by the pressure of the fluid, displace the plastic molding compound that is located in the article cavity 3 into the secondary cavity.

The projectile 8 that is plug-fitted onto the distal end of the shaft 9 has a maximum external diameter which is larger than the second diameter of the shank, such that the projectile 8 forms a temporary undercut of the nozzle body 7, said temporary undercut being capable of being filled with the molding compound.

Furthermore, an additional component in the form of an annular magnet 14 is plug-fitted onto the shank 9 of the nozzle body 7 in the region of the first diameter, said annular magnet 14 conjointly with the nozzle body 7 being moved into the article cavity 3 prior to the latter being filled with the thermoplastic molding compound.

In the case of the method according to the invention, for example, the tool 2 is first closed, thereafter the nozzle body 7 conjointly with the annular magnet 14 that is releasably plug-fitted onto the shank 9 is moved from a second de-molding position to a first, shape-imparting position in which the shank 9 plunges into the article cavity 3 and seals the latter. Thereafter the article cavity 3 is filled with the thermoplastic molding compound by way of one or a plurality of sprues (not illustrated). Full or partial filling can be performed. The thermoplastic molding compound also fills the article cavity in the region of the molding cavity 17 that is formed between the nozzle body 7 and the tool 2, wherein the thermoplastic molding compound encloses and embeds the annular magnet 14. The thermoplastic molding compound furthermore flows behind the projectile 8 since the diameter of the shank 9 (second diameter) directly upstream of the projectile 8 is smaller than the maximum diameter of the projectile 8.

Once the article cavity 3 has been filled with the thermoplastic molding compound the secondary cavity (not shown) is released, for example by way of hydraulically activatable slides.

In a further method step thereafter, a pressurized fluid, for example water, is driven through the fluid duct 15 toward the projectile 8 and toward the second projectile 13. The fluid drives the projectiles 8, 13 through the article cavity 3, wherein the projectile 8 molds the shape of a primary tube 16 and the second projectile 13 molds the shape of the secondary tube 12. The projectiles 8, 13 displace a molten core of the molding compound, the remaining wall/delimitation wall of the tube configured as the filler tube 4 left standing.

In a further method step the nozzle body 7 is moved to a second, de-molded, that is to say retracted position, wherein the annular magnet 14 remains in the molding compound that has been filled.

The article is subsequently de-molded. The article in the form of the filler tube 4 is illustrated in FIG. 2. The filler tube comprises the primary tube indicated by the reference sign 16, which defines a charging duct in a container, and the secondary tube indicated by the reference sign 12, which forms a ventilation line. The filler tube 4 comprises the filler head 5 having an orifice connector 18 which is provided with an external thread 19. The orifice connector 18 encloses a filling duct 20 which extends from the orifice connector 18 through the filler head 5 into the primary tube 16.

LIST OF REFERENCE SIGNS

1 Injection-molding device
2 Tool
3 Article cavity
4 Filler tube
5 Filler head
6 Injection device
7 Nozzle body
8 Projectile
9 Shank
10 Grooves
12 Secondary tube
13 Second projectile
14 Annular magnet
15 Fluid duct
16 Primary tube
17 Molding cavity
18 Orifice connector
19 External thread
20 Filling duct

What is claimed is:

1. A method of producing a tubular component as an article from thermoplastic material via an injection-molding device having a tool that comprises an article cavity to form the article, the method comprising:
   a) equipping a nozzle body of an injection device of the injection-molding device with an additional component to be incorporated into the article, wherein the nozzle body provides a carrier for the additional component;
   b) introducing the nozzle body to the article cavity, wherein the nozzle body provides a mold core which shapes at least a portion of the article;
   c) filling the article cavity at least partially with the thermoplastic material, wherein the thermoplastic material is provided from the injection-molding device;
   d) introducing a pressurized fluid into the article cavity such that a portion of the thermoplastic material is displaced from the article cavity, wherein the pressurized fluid is provided from the injection device of the injection-molding device; and
   e) de-molding the article.

2. The method as claimed in claim 1, wherein the nozzle body is configured as a projectile carrier to receive at least one projectile,
   wherein the nozzle body, prior to method step b), is equipped with the at least one projectile, and
   wherein the pressurized fluid introduced into the article cavity drives the at least one projectile through the article cavity while displacing a molten core of the thermoplastic material from the article cavity.

3. The method as claimed in claim 1, wherein the additional component is embedded into the thermoplastic material.

4. The method as claimed in claim 1, wherein the nozzle body, after method step d) and prior to method step e), is removed from the article cavity while the additional component remains in the article.

5. The method as claimed in claim 1, wherein the additional component comprises a permanently magnetic ring which is releasably fitted onto the nozzle body.

6. The method as claimed in claim 1, wherein the article comprises a duct for a liquid container.

7. The method as claimed in claim 1, wherein an internal wall of the article in a longitudinal direction is profiled such that the article is provided with one or more longitudinal ribs.

8. The method as claimed in claim 1, wherein the internal wall of the article is configured with at least one constriction.

9. An injection-molding device for producing a tubular component as an article from a thermoplastic synthetic material, having a tool that forms an article cavity, having means for filling the article cavity with a thermoplastic molding compound, having at least one injection device for injecting a fluid into the article cavity, wherein the injection device comprises a nozzle body which has at least one fluid duct which is capable of being supplied with a pressurized fluid, wherein the nozzle body is configured as a mold core for molding the shape of an end of the article, wherein the nozzle body is a carrier for an additional component to be incorporated into the article.

10. The injection-molding device as claimed in claim 9, wherein the nozzle body is configured as a projectile carrier for receiving a projectile as a displacement member for the molding compound.

11. The injection-molding device as claimed in claim 10, wherein the nozzle body has a shape-imparting shank which conjointly with the article cavity forms a molding cavity that is capable of being filled with the molding compound.

12. The injection-molding device as claimed in claim 11, wherein the shank is profiled.

13. The injection-molding device as claimed in claim 11, wherein the shank has a first comparatively large and a second comparatively small cross section, and in that the shank tapers off in the direction toward the distal end.

14. The injection-molding device as claimed in claim 13, wherein the distal end is configured as a projectile receptacle, and in that the projectile has a cross section that is larger than the second cross section.

15. The method as claimed in claim 6, wherein the duct comprises a filling duct for the liquid container.

16. The method as claimed in claim 1, wherein the article comprises a filler tube for a liquid container of a motor vehicle.

17. The method as claimed in claim 16, wherein the filler tube comprises a filling duct and a ventilation line.

18. The method as claimed in claim 1, wherein the mold core of the nozzle body shapes at least an end of the article.

19. The method as claimed in claim 1, wherein the nozzle body is introduced into the article cavity when the tool is closed or by closing the tool around the nozzle body.

20. The method as claimed in claim 1, wherein the thermoplastic material is displaced from the article cavity into a secondary cavity or another volume.

\* \* \* \* \*